Oct. 7, 1930. H. C. WADE 1,777,708
APPARATUS FOR HEAT TREATING HYDROCARBON OILS
Filed May 2, 1928 2 Sheets-Sheet 2

INVENTOR
Henry Clay Wade

Patented Oct. 7, 1930

1,777,708

UNITED STATES PATENT OFFICE

HENRY CLAY WADE, OF LOS ANGELES, CALIFORNIA, ASSIGNOR TO HYDROGENATING PROCESS CORPORATION, A CORPORATION OF NEVADA

APPARATUS FOR HEAT TREATING HYDROCARBON OILS

Application filed May 2, 1928. Serial No. 274,392.

The object of the present invention is to provide an apparatus for the heat treatment of hydrocarbon fuels as, for example, in the conversion of heavy hydrocarbons into lighter bodies by heat, and the particular object being to enable the use of a plurality of coils within a single kiln in such manner that the vapors passing through respective coils will be identically treated, the apparatus being such that nine or more coils may be employed within a kiln of normal dimensions and each coil may have the same length with the same lineal feet of pipe as in the case of each of the other coils.

In other words, the path of travel of the gases in one coil may be the same as in any other coil. The arrangement enables great economy in the use of fuel within the kiln, and unusual capacity per kiln, so that construction costs in a plant for a given capacity are very much lowered comparative to plants of the same capacity now commercially used.

The invention will be understood with reference to the accompanying drawings in which—

Figure 1A is a diagrammatic plan view of the outlet ends of the coils and their connections with a manifold;

Figure 4 is a detail sectional view of a coil outlet showing diagrammatically the use of a catalyzer.

Figure 1:
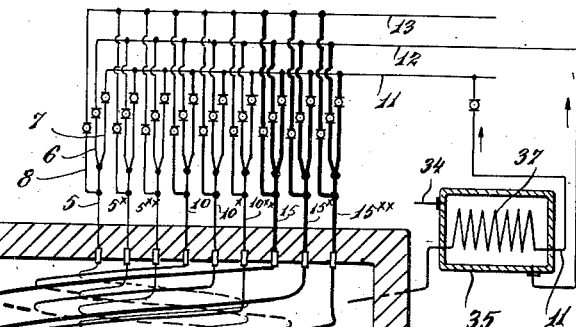
Figure 1 is a sectional elevation of an embodiment of the invention, the coils being shown diagrammatically.
Figure 2:
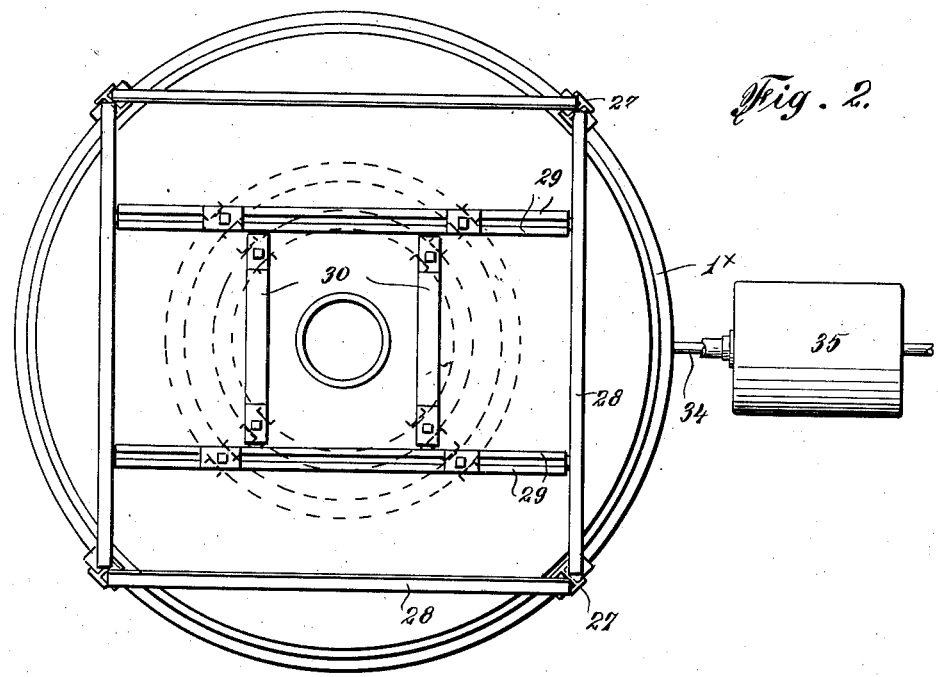
Figure 2 is a plan view of the embodiment.

In the drawings, 1 illustrates a conventional form of kiln having a core 2, fire-box 3 and outlet flue 4. The kiln contains nine coils, the coils being in series of three each. The first series of three coils have inlet headers 5, 5$^x$, 5$^{xx}$. Each header communicates with a valve controlled pipe 6 for oil, a valve controlled pipe 7 for water or steam and a valve controlled pipe 8 for air. Three coils of the first series are so formed that they interfit, the convolutions not only having the same axis, but having the same diameter. When interfitted they have the appearance of a single coil. In the drawing the outlet ends of the three coils of the first series are indicated at 9, 9$^x$ and 9$^{xx}$.

The coils of the second series, three in number, are connected to headers 10, 10$^x$ and 10$^{xx}$, each header having valve controlled connections with the water pipe 11, the oil pipe 12, and the air pipe 13. The three coils of the second series are interfitting and have the appearance, when assembled, of a single coil. They embrace the coils of the first series and their diameter, therefore, is sufficiently greater than the diameter of the first series of coils to permit them to be passed over the first coils and to surround the latter. The outlet ends of the coils of the second series are indicated at 14, 14$^x$ and 14$^{xx}$.

The coils of the third series are connected to headers 15, 15$^x$ and 15$^{xx}$, each of these headers having valve controlled connections with the water, oil and air pipes 11, 12 and 13 respectively.

The coils of the third series are interfitting and appear, when assembled, as a single coil. The diameter of each of the coils of the third series is sufficiently greater than the coils of the second series to be placed in position over the latter coils so as to embrace the same. The outlet ends of the coils of the third series are indicated at 16, 16$^x$ and 16$^{xx}$. Each coil of the third series may be connected by valve controlled pipes indicated at 17 to a manifold 18, which may be connected by a conduit or conduits with succeeding apparatus indicated at 19 for continuing the treatment of the vapors and condensates.

As shown in Figure 1A, the outlet ends of the coils may be connected to the manifold 18 by valve controlled branches, one of which is indicated at 20 in said figure and each coil may also extend beyond the manifold, the extension being valve controlled as at 21.

Each coil may near its outlet end contain a catalyzer of any suitable form as indicated at 22, Figure 4.

Figure 3:
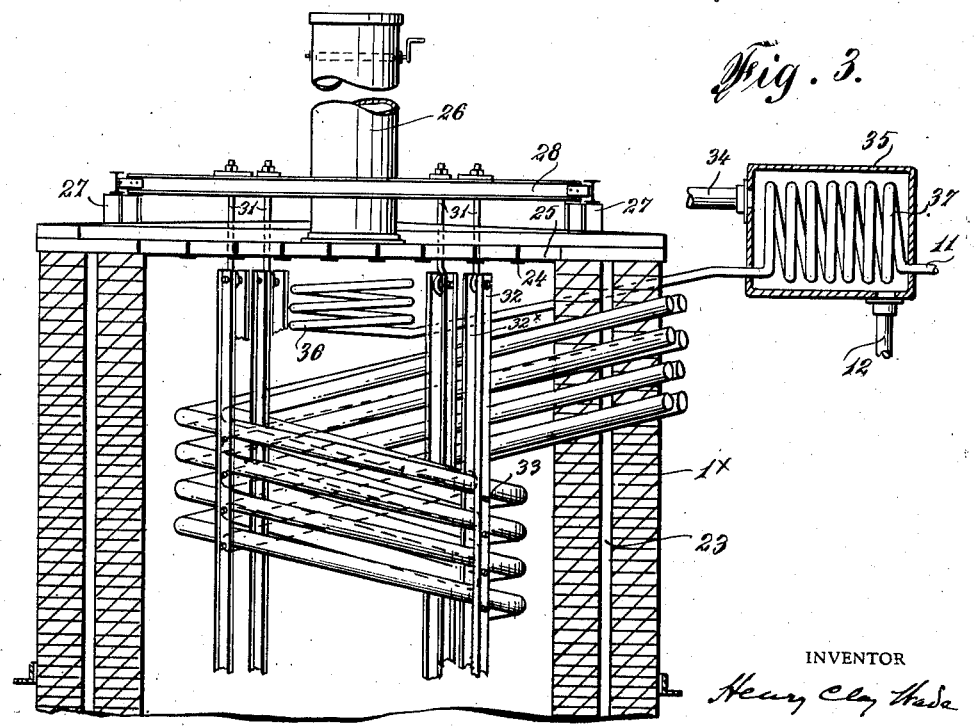
Figure 3 is a sectional elevation of an embodiment showing details of construction as to mounting of the coils where two series thereof are employed.

As illustrated in Figure 3, the kiln 1$^x$ may be formed with an internal annular chamber 23 which may be packed with a refractory material such as silica. At the top of the kiln crossed T-bars 24 are employed to hold the brick work 25 in position and to support the stack 26. Suitably supported as by the risers 27 is a rectangular frame formed by the bars 28, which frame in turn supports beams 29 and 30.

From the said beams depend hangers 31, each hanger supporting two parallel vertically disposed bars such as the bars 32, 32ˣ. Four sets of vertical bars are provided for each set of three coils, one bar contacting with the coils exterior thereof and one bar contacting with the coils interior thereof, in each case, the bars being connected at the base of each coil-turn by bolts such as bolt 33, the coils then being supported by the bolts and held against sagging. This is an important feature inasmuch as it is desirable that the sets of coils occupy the same lineal distance within the kiln so as to receive, as near as possible, the same heat treatment, and inasmuch as the second and third series embrace the first series it necessarily follows that the turns of convolutions of the first series must be more closely spaced than those of the second series and that turns of the third series be mutually separated a greater distance than the turns of the first and second series, as indicated in Figure 1 of the drawings.

In order to heat the oil passing to the oil pipe line 12, it may be fed through a conduit 34 to heating chamber 35 and thence be passed to pipe 12. The heating medium may be water passed through a coil 36 within the kiln, thence through a coil 37 within the heating chamber, the water thence passing to pipe 11.

I claim:

In apparatus for the heat treatment of hydrocarbon oils, a kiln and a coil construction within the kiln comprising a plurality of series of coils, the coils of each series lying contiguous and having the same axis and diameter and one series of coils embracing a second series so that the two series have substantially the same axis, the lineal capacity of one series being substantially the same as a second series, and each coil having a discharge outlet at its base.

In testimony whereof, I have signed my name to this specification.

HENRY CLAY WADE.